June 11, 1929. B. B. FOULKROD 1,717,022
COMBINATION STOP AND CHECK VALVE
Filed June 10, 1927
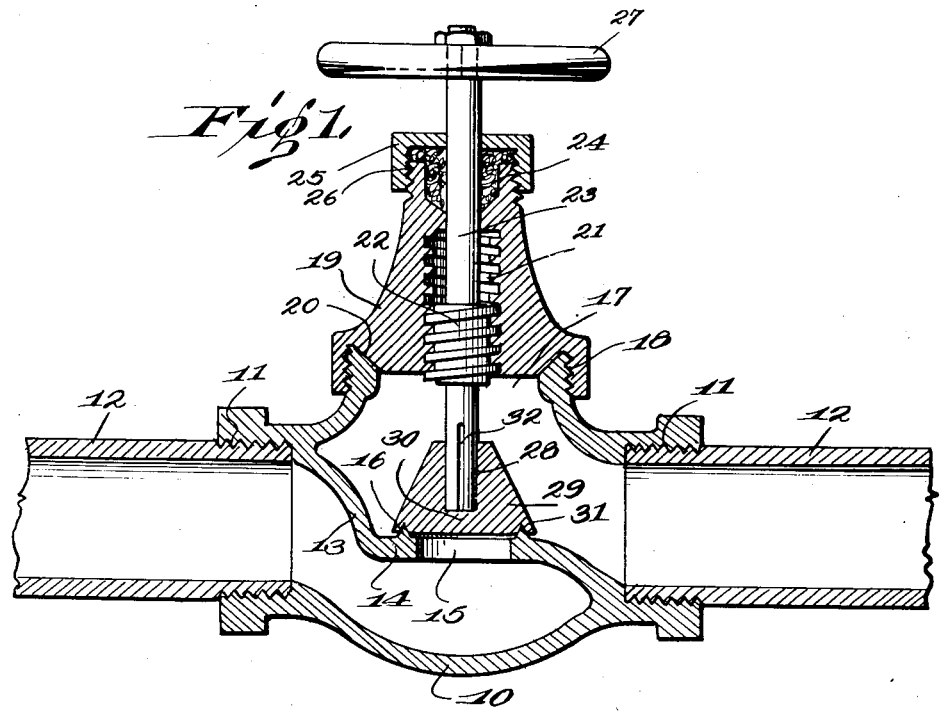
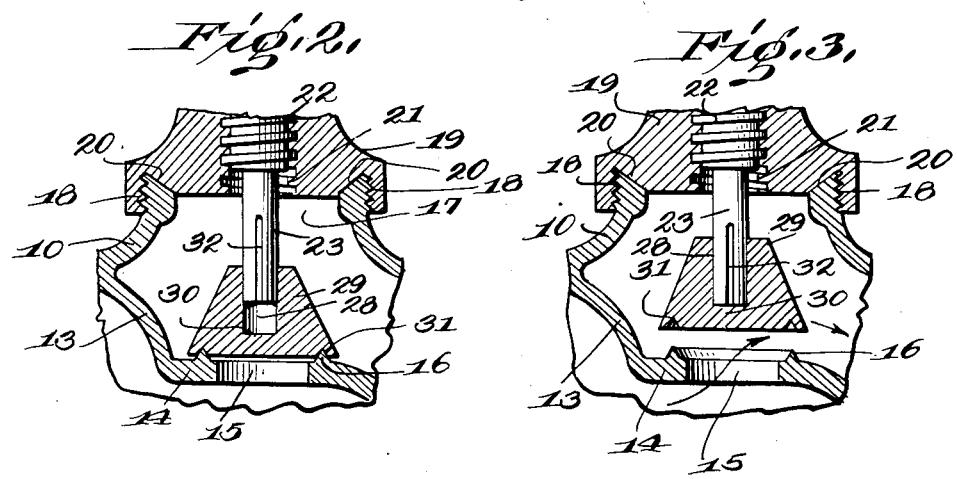
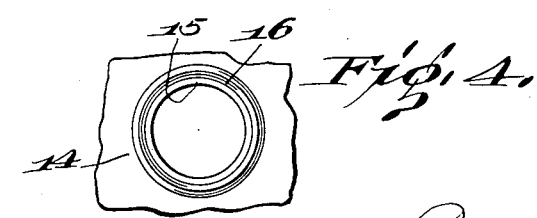
Inventor
Byron B Foulkrod.

Patented June 11, 1929.

1,717,022

UNITED STATES PATENT OFFICE.

BYRON BURDETTE FOULKROD, OF JAMESTOWN, NEW YORK.

COMBINATION STOP AND CHECK VALVE.

Application filed June 10, 1927. Serial No. 197,887.

The present invention relates to a valve, and aims to provide a novel and improved device of this character constructed for regulating the flow of high pressure steam, water, etc., and arranged so that when the flow thereof is reversed, the valve will close, thus providing a combinaton stop valve and check valve.

My invention contemplates the provision of a valve slidable on an adjustable valve stem, said valve being adapted to be raised when water, steam, etc., flows under pressure in one direction and closed when the same flows in the opposite direction, the opening of the valve being governed by the position of the adjustable valve stem, the arrangement of parts presenting a device of the above indicated character, which is simple, cheap, and substantial in construction, as well as efficient and practical in use.

With the foregoing and other objects in view, which will be apparent as the description proceeds, the invention resides in the construction and arrangement of parts, as hereinafter described and claimed, it being understood that the construction of the valve may be modified in unimportant details within the scope of what is claimed, without departing from the spirit of the invention.

The invention is illustrated in the accompanying drawings, wherein:

Figure 1 is a vertical section through my improved valve,

Figure 2 is a fragmentary section similar to a portion of Figure 1, but showing the valve stem in another position, Figure 3 is a view similar to Figure 2 showing the valve raised from the seat, and Figure 4 is a fragmentary plan of the valve seat.

Referring to the drawings, the numeral 10 designates the valve casing, provided at opposite sides with threaded openings 11 into which are threaded conductors or pipes 12, and within the valve casing is a partition 13, provided with a flat horizontal surface 14, approximately in alinement with the center of the conductors or pipes 12. In the flat portion 14 of the partition is a port 15 around which is an inverted V-shaped annular ridge 16 forming the valve seat. By referring to Figure 1 of the drawings, it can be seen that one of the pipes 12 is in communication with the lower chamber of the valve casing and formed by the partition that the other pipe 12 is in comunication with the upper chamber.

The upper end of the valve casing 10 is open, as at 17, and is provided with exterior screw threads 18 engaged by female threads in the lower end of the valve head. The opening in the casing is beveled inwardly and the abutting surface of the valve head is correspondingly shaped to seat therein, as indicated by the numeral 20 so as to assure a tight and leak-proof connection between the casing 10 and head 19. The valve head has a threaded opening 21 extending upwardly therein from its lower end centrally engaged by a threaded collar 22 on the valve stem 23, and in the upper portion of said head is a cylindrical recess 24 for receiving packing or the like held therein by means of a cap 25 threaded upon the upper end of the head, as at 26. The portion of the head between the threaded opening 21 and recess 24 is bored for the valve stem, which also extends through an opening in the cap 25, and the upper end of the valve stem is provided with a handle 27 for turning the same.

On the lower end of the valve stem 23 is slidably mounted a valve disk 29 having an opening 28 in the upper end thereof to receive the lower end of said stem, said opening terminating at 30 near the lower end of the disk. In the lower portion of the valve disk 29 is provided a V-shaped groove 31 into which extends the annular inverted V-shaped ridge on the valve seat when the valve is in closed position for assuring proper seating of the valve. It is to be noted that the valve disk 29 is shaped in the form of a frustrated cone, the purpose of which is to cause the seating of the valve when the steam, water, etc., under high pressure is reversed. In the opposite sides of the lower portion of the valve stem 23 on which the valve disk 29 is slidable are grooves forming vents to relieve compression or suction in the lower end of the opening 28 when said valve changes its position with relation to the valve seat and stem.

In operation, communication between the pipes 12 may be cut off by turning the handle 27 until the end of the valve stem 23 engages the lower end of the opening 28 in the disk 29 and forces the latter into tight engagement with the valve seat. When it is desired to open the valve, the handle is turned in the opposite direction and the stem will be raised to a desired position as for instance that indicated in Figure 2 of the drawings, and in this position when fluid flows under pressure to the lower chamber of the valve casing 10, it will force the valve 29 upwardly and pass into the upper chamber on to the other pipe connected to the valve. It is to be noted that the position of the valve stem will regulate the amount of movement of the valve disk 29, the opening movement of the latter being limited by engagement with the end of the valve stem, as is illustrated in Figure 3 of the drawings. As soon as the flow of steam or water is reversed and enters the valve casing at the upper chamber, the valve disk 29 will immediately drop and tightly engage the seat, thus preventing a back-flow.

Having thus described my invention, what I claim as new is:

A check valve comprising a casing having a transverse partition therein with an opening and surrounding valve-seat, the latter being in the form of an annular ridge beveled in opposite directions, an adjustable valve-stem threaded through the upper end of the casing and having grooves at opposite sides thereof extending from the lower end of the stem upwardly, and a valve-disk in the form of a frustrated cone having an annular groove in its lower end to receive the valve seat and a central opening in its upper end corresponding in diameter with the diameter of the lower portion of the stem and extending downwardly from the center of said disk to near the bottom thereof to receive the stem for slidable movement thereon, the aforesaid grooves in the lower portion of the stem extending above the valve-disk in the closed position of the valve to provide vents for the quick operation of the valve.

BYRON BURDETTE FOULKROD.